United States Patent [19]

Brodbeck

[11] 4,408,101
[45] Oct. 4, 1983

[54] AUTOMATIC TELEPHONE DIALING APPARATUS WITH MAGNETIC SWITCH ASSEMBLY

[75] Inventor: Robert M. Brodbeck, Littleton, Colo.

[73] Assignee: Marcamor, Inc., Denver, Colo.

[21] Appl. No.: 369,137

[22] Filed: Apr. 16, 1982

Related U.S. Application Data

[63] Continuation-in-part of Ser. No. 193,658, Oct. 30, 1980.

[51] Int. Cl.³ .......................................... H04M 1/274
[52] U.S. Cl. .............................. 179/90 BD; 179/90 B; 335/206; 340/365 VL
[58] Field of Search ............ 179/90 B, 90 BD, 90 CS; 200/5 R, 175, 176, 179, 19 M; 335/205, 206; 340/365 VL

[56] References Cited

U.S. PATENT DOCUMENTS

| | | | |
|---|---|---|---|
| 2,995,726 | 8/1961 | Rickard | 340/365 VL |
| 3,060,291 | 10/1962 | Clare | 335/206 |
| 3,151,226 | 9/1964 | Jones et al. | 335/206 |
| 3,531,599 | 9/1970 | Bodie | 179/90 B |
| 3,598,890 | 8/1971 | Suzuki | 335/206 |
| 3,600,592 | 8/1971 | Mahon et al. | 340/365 VL |
| 3,721,929 | 3/1973 | Gobriel et al. | 335/206 |
| 4,164,630 | 8/1979 | Brodbeck | 179/90 B |
| 4,257,179 | 3/1981 | Oka et al. | 340/365 VL |
| 4,277,651 | 7/1981 | Fisher et al. | 179/90 BD |
| 4,278,845 | 7/1981 | Chiou | 179/90 B |

FOREIGN PATENT DOCUMENTS

| | | | |
|---|---|---|---|
| 1007833 | 10/1965 | United Kingdom | 335/206 |
| 1059340 | 2/1967 | United Kingdom | 335/206 |
| 1219547 | 1/1971 | United Kingdom | 179/90 B |

Primary Examiner—Gerald L. Brigance
Attorney, Agent, or Firm—Ancel W. Lewis, Jr.

[57] ABSTRACT

A telephone number index and switch device has a series of magnetic switches which are located in fixed positions with corresponding surfaces disposed along a preestablished path of movement of a card finder associated with cards having names and telephone numbers. A magnetic actuator is carried by the card finder but is not in physical contact with the magnetic switches for successively actuating the magnetic switches. A second switch separate and independent from the magnetic switches is used to complete the automatic dialing once a number is selected from the index and a magnetic switch has been actuated.

8 Claims, 10 Drawing Figures

AUTOMATIC TELEPHONE DIALING APPARATUS WITH MAGNETIC SWITCH ASSEMBLY

CROSS-REFERENCE TO RELATED APPLICATION

This is a continuation-in-part of U.S. patent application Ser. No. 193,658, filed Oct. 30, 1980.

TECHNICAL FIELD

This invention relates to an index and switching arrangement for automatic telephone dialing which includes a series of magnetic switches mounted in a row, arranged for single, progressive operation by a small activator progressively passed across the switches, and more particularly to a potted, gang of separated magnetic switches mounted so as to be singly operated by a single magnetic actuator moved across the gang for an automatic dialing telephone, initially closing the circuit to a particular register in the memory bank of a computer operating the telephone dialer.

BACKGROUND ART

A series of separate electric circuits controlled by a single selector switch may be found in numerous electric and electronic devices, for example, a t.v. channel selector, automatic computer registers, dial telephone devices, etc. It is to the advantage of the units if the switch arrangement is essentially maintenance free, as a number of switches or relays may be ganged together and it is difficult to replace a single damaged switch.

A number of automatic dial systems for telephones have been proposed in the prior art, and these generally use wiper contacts for activating the circuits necessary for the dialing unit. Among the devices using a gang of switches or relays are the following examples:

Rickard U.S. Pat. No. 2,995,726 uses a loose leaf book with a selector attached to the book cover. Each page includes a contact for closing when the book is opened to that page. By using progressively cut away sheets, the selector may open the book to the selected page, and a wiper arm on the selector physically touches the page contact to close the circuit.

Brodie U.S. Pat. No. 3,531,599 uses a matrix of columns of switches and rows of switches. The switches are open contact subject to activation by the physical touching of moving contacts of wipers for each row. These are moved by electro-mechanical means causing the moving contact to be stopped from one to the next fixed contact.

Shio U.S. Pat. No. 4,010,330 discloses a gang of open contacts wiped by a moving contact. Each open contact is connected to an interchangeable circuit module, having a predetermined telephone number, for actuating the dialing apparatus.

British Pat. No. 1,219,547 describes a hinged cover, multiple page list. Each page is arranged with a switch which actuates when the cover is opened to that page. The multiple cover releases include a switch related to the coded lines of each page. The opening of the cover pivots one of a gang of wipers, and the wiper in line with the contact of the displaced page touches the contact, closing that circuit (to a memory). A push of the cover releases a button related to the desired line on the displayed page and activates that circuit which contains the pre-recorded number. This actuates automatic dialing apparatus.

Applicant's U.S. Pat. No. 4,163,360 describes an automatic dial telephone also using a hinged cover arranged to open to a particular page matching a particular computer register. A button at the side of the page activates a circuit of the address of the particular register containing the dialing information for the automatic dialer. The telephone finder list includes an open contact for each page of the telephone index and a touching wiper to close the circuit for activation.

DISCLOSURE OF INVENTION

The present invention provides an improvement over the open contacts and wipers of the prior art by providing a ganged series of magnetic relays or magnetic switching devices operable by a moving magnet passing in the vicinity of the magnetic relays or switching devices. For effectiveness, the relays are potted in a block, which provides easy removal and replacement of the block, for replacement of damaged relays or assembly of the unit.

OBJECTS OF THE INVENTION

Included among the objects and advantages of the invention is to provide an assembly of ganged magnetic switch devices such as magnetic relays or Hall-effect switches for automatic dial telephone devices requiring a plurality of registers and switches for the various circuits of the registers.

Another object of the invention is to provide a ganged series of magnetic relays, potted in a module for easy and fast assembly in a telephone directory requiring the plurality of switches.

Still another object of the invention is to provide a gang of magnetic relays mounted in a series, each for an individual alphabet register in a telephone dialing system, and potted in a block at a uniform level for accurate actuation by a magnet actuator passed over the block.

Yet another object of the invention is to provide a gang of magnetic relays potted in a block at a uniform level from the top surface of the block, and in one form each magnetically insulated from the other for actuation of a single relay by a magnet adjacent to the top surface of the block for use in the directory or repertoire of an automatic dial telephone.

BRIEF DESCRIPTION OF DRAWINGS

The details of this invention will be described in connection with the accompanying drawings, in which.

DETAILED DESCRIPTION

Figure 2:
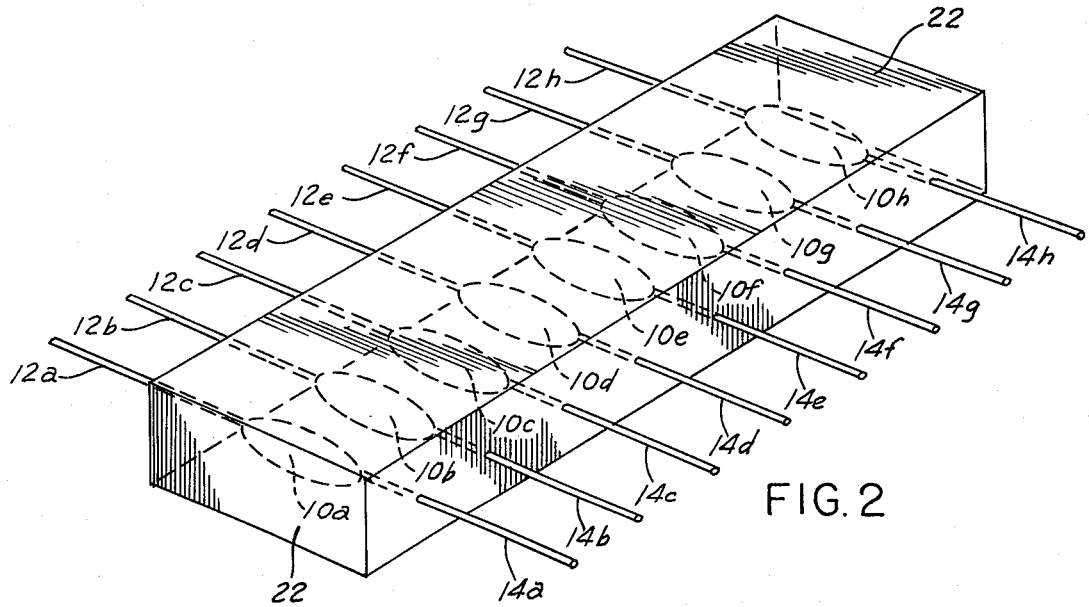
FIG. 2 is a generally schematic perspective of a gang of magnetic relays, potted in a block, with the leads from each extending beyond the block.
Figure 3:
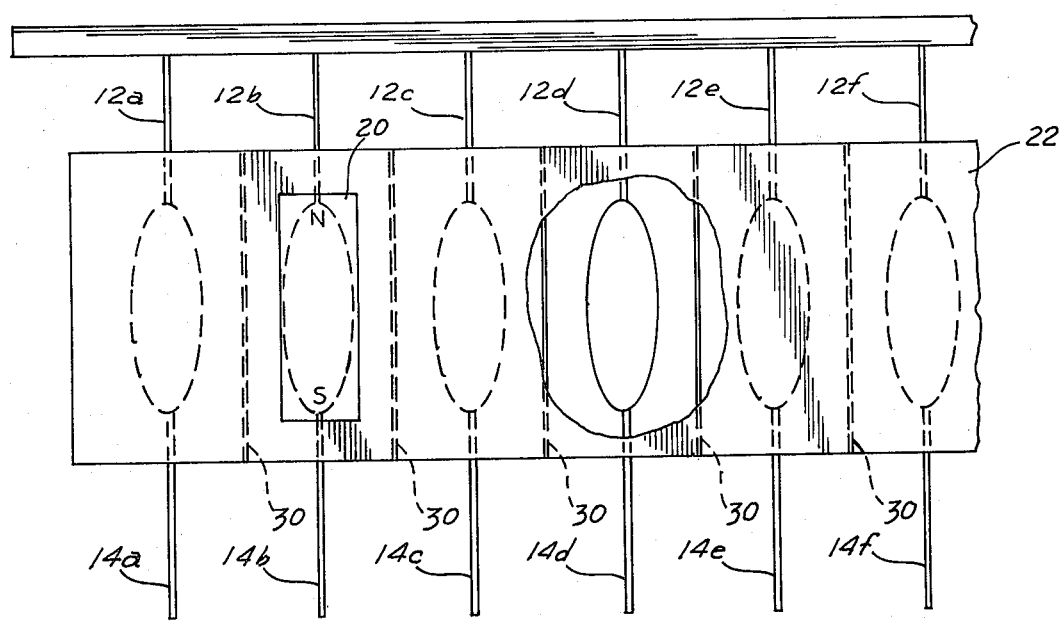
FIG. 3 is a top plan view of the device of FIG. 2, illustrating the position of the magnetic relays and shielding.

The invention is effectively used for multiple circuit devices in which a single circuit is activated for a particular type of action. The embodiment shown has a potted block of a plurality of magnetic relays, preferably miniaturized magnetic relays. Leads from the relays are extended out through the block for connection to leads for the individual circuits being controlled. One form is shown in FIGS. 2 and 3, where a rectangular block contains a plurality of ganged relays. For rotary activators, the relays are potted in a circle (or part of a circle), usually in a circular block. Other shapes are within the present concept of having a gang of relays or switches.

Figure 1:
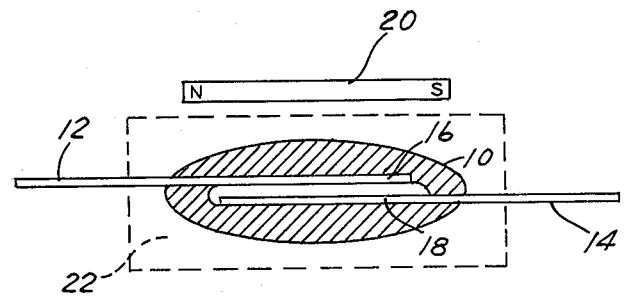
FIG. 1 is a detailed enlargement of a miniature magnetic relay, in section, with a magnetic actuator.

A miniature magnetic relay body 10, FIG. 1, includes leads 12 and 14. Contacts, internally of a plastic body, include a fixed contact 16 and a movable contact or reed 18 which is paramagnetic or magnetizable and operable by a magnetic field. A small magnet 20 brought into the vicinity of the magnetic relay causes the contact 18 to move into contact with the fixed contact to close the circuit between lead 12 and lead 14. Such magnetic relays are common commercial items.

A series of such magnetic relays are embedded in a non-metallic potting material (a synthetic plastic such as a polyurethane or the like). Thus, relays 10a, 10b, 10c, etc., are embedded in a block 22 of potting compound, which sets or cures into a rigid block. The material may be transparent, clear, or variously colored as desired by the maker. The positioning of the relays is shown in FIG. 1, where the upper surface of the relay is spaced a predetermined distance from the smooth top surface of the block. The relays are preferably positioned within a reasonably close tolerance so that the magnetic field from the magnet passed over the block at a uniform distance from the top surface, or in some instances moved across the top surface of the block, induces the same force on each relay.

The relays are magnetically separated by a magnetic shield to permit the relays to be placed closer together. Such shields, as the shields 30, are placed between the relays and are embedded in the potting material. The magnetic shield is preferably a heavy metal foil or the like, such as lead, tin, etc., rolled into sheet form. The thickness of the foil is determined by the strength of the field of the movable magnet passed over the block, and this includes the distance of the magnet from the relays.

The activating magnet is of a size to be well within the boundary of two adjacent shields when above the contacts of a relay, as shown in FIG. 3, so as to provide activation of only one relay at a time. The mechanism holding the magnet may be made so as to stop over each relay between the foil strips, thereby reducing the change of activating two relays at any one time.

As shown in FIG. 3, one set of leads 12 from the relays is connected to a bus bar 33. This bus bar may also be embedded in the block, providing a single lead for the leads from that side. The leads 14 may be connected to an encased cable which terminates in a terminal connecting block for connection to a mating terminal connection block, for easy assembly of the block in any using device.

Figure 4:
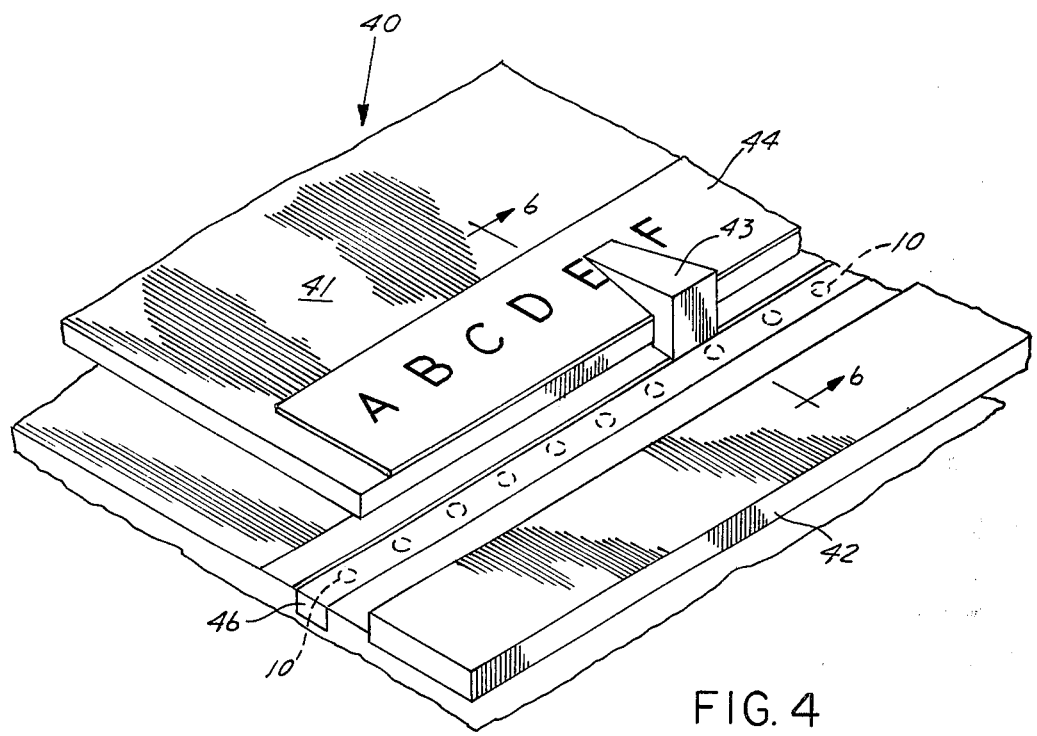
FIG. 4 is a portion of a telephone list repertoire, in perspective, showing one use of the invention for an automatic dialing telephone.
Figure 5:
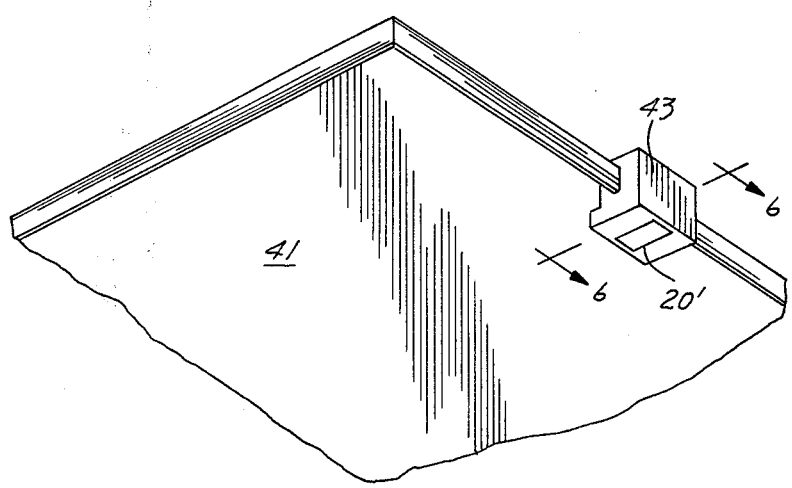
FIG. 5 is a partial perspective of a list cover and page finder with actuator of the device of FIG. 4.
Figure 6:
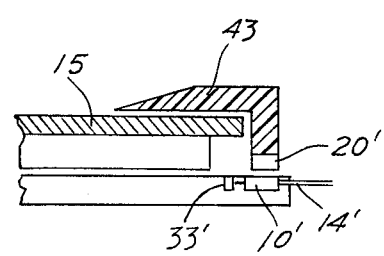
FIG. 6 is a cross-sectional detail of the alinement of the page finder and relay block of the invention applied to a telephone number repertoire for the automatic telephone.

For using the unit of the invention, for example, in a telephone list or registry for an automatic dialing telephone, an index 40 (FIGS. 4, 5 and 6) may be employed. The index or name repertoire includes a hinged cover 41 mounted on a base 42. The cover is held latched until a selector-release 43 is depressed, which releases the cover for pivoting to the open position. The selector-release 43 may be moved along the cover to a station or position desired, shown by a letter of the alphabet (sometimes two or more letters at a station) on plate 44.

A block 46 containing magnetic relays 10' embedded therein is mounted in a base 42 under selector-release 43 which may be moved along the cover over the block to affect the magnetic relays embedded in the block. One lead from each of the relays is connected to bus bar 33 and the other leads 14 are individually connected to the individual circuits of an automatic dialing telephone, for example. Movement of the magnet in the selector-release along the block progressively closes each circuit and, after passing, the circuit is opened by action of a relay out of influence with a magnetic field.

When the selector-release is stopped on a particular station or letter, and with the magnet over a single relay, it is depressed. This action maintains that circuit closed, even though the selector-release is raised with the cover, by a latch circuit, holding the particular memory register (represented by the page of repertoire) in the circuit until one line button (adjacent to each line) is depressed, giving access to the particular address. The desired number, indicated by a name on that line of the page of the index, is then dialed by the automatic dialing means, as set out in U.S. Pat. No. 4,164,360, or a similar dialing device.

Figure 7:
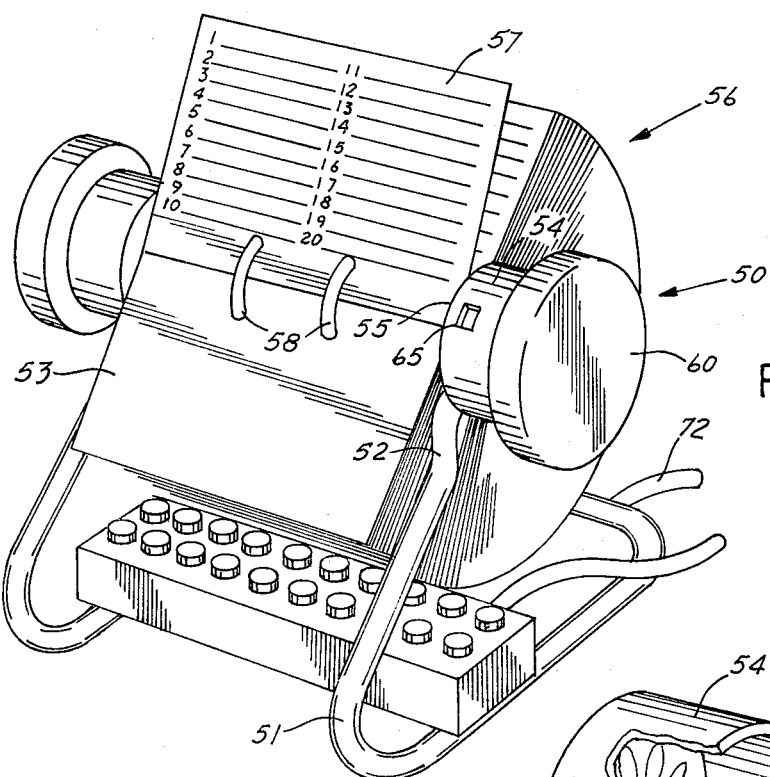
FIG. 7 is a perspective view of a circular card telephone index utilizing the switch assembly of the invention.

A circular card index arrangement for an automatic dialing telephone device is shown in FIG. 7. For such a unit, an automatic dial mechanism includes a microprocessor having a memory. The memory is divided into registers, each being an alphabet register for a predetermined quantity of telephone numbers. For the circular card index, one register is provided for each card. As shown, each card includes twenty spaces for twenty telephone numbers, listed by name and telephone number. Each register has twenty addresses, each of which can store one telephone number. The circular card index is turned to the alphabet listing for the first letter of the name and, when positioned for view, the number of the line is ascertained. A line button is pushed, of the number of the telephone number, and the automatic dialer impresses the necessary dial tone of that number on the telephone line.

Figure 8:
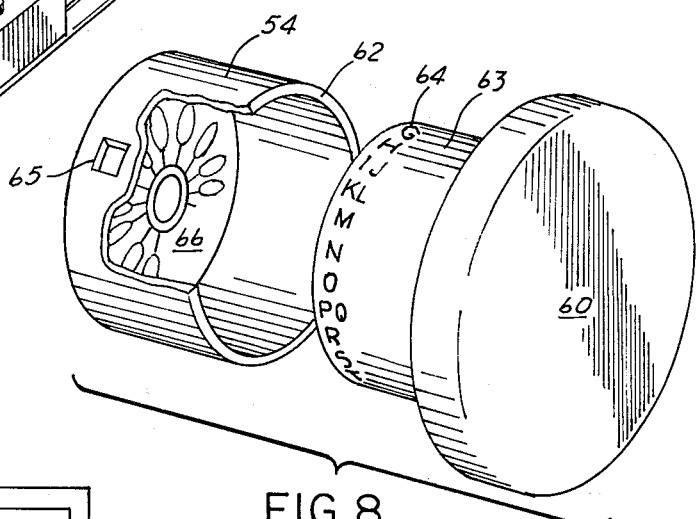
FIG. 8 is an exploded perspective view of the switch arrangement for the circular card index, showing the arrangement of the switches and activator.
Figure 9:
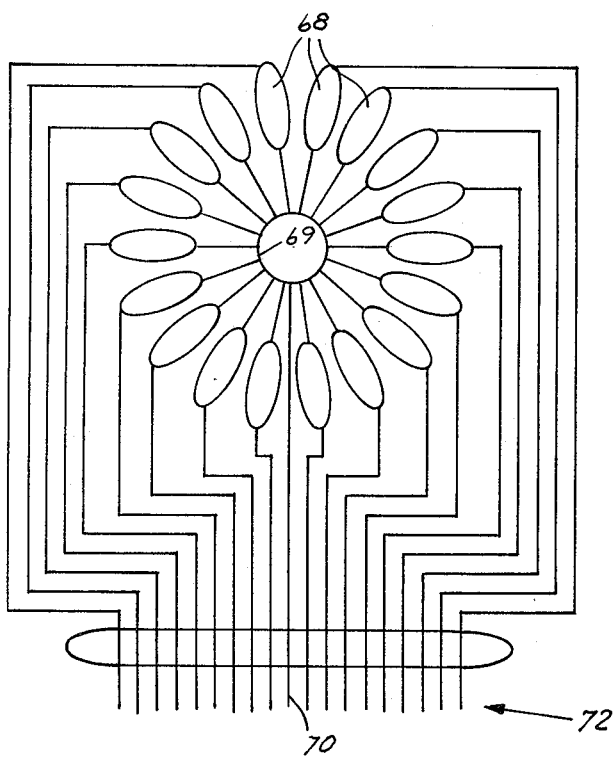
FIG. 9 is a schematic wiring diagram of the potted switch arrangement for a circular card index.

A circular card index, shown generally by the numeral 50, includes a frame member 51 with two upper ends 52 and 53. A stationary hub 54 is mounted on end 52 and supports a shaft 55. A series of cards 56, one of which is displayed as indicated at 57, are mounted on the shaft by holders 58 of a conventional circular card index. The shaft has a turning knob 60 secured thereto and journalled in the hub 54. The hub 54 (FIG. 8) has a tubular extension 62 into which knob extension 63 telescopes. A window 65 in extension 62 displays one of the letters of the series 64 on the knob extension. This letter is correlated with the card. Such card index devices have a temporary stop so as to hold the displayed card in viewing position.

Figure 10:
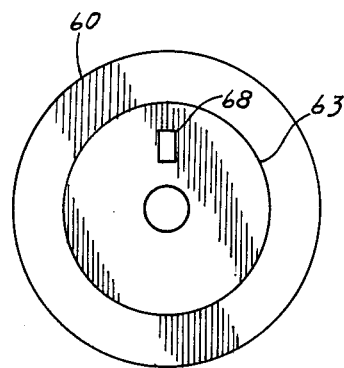
FIG. 10 is a front elevational view of the turning knob of the circular card index with the placement of the magnetic actuator for the switch assembly.

A switch block 66 is mounted around the shaft hole in the hub and a magnetic actuator 68 (FIG. 10) is mounted or embedded in the knob extension 63 in position to singly actuate one of the switch assemblies of the block 66. The block 66 is potting material with a plurality of magnetic switching devices embedded therein, in a manner similar to the rectangular block of FIGS. 1-6.

The switches 68 are mounted in a circle, with the inner lead attached to a bus ring 69, common to all switches, which is attached to cable line 70. The other lead of each switch is connected to one of the cable lines in a cable indicated by numeral 72. The cable 72 passes down through the hollow tube 51 and extends out the back of the frame. The cable then passes to the microprocessor and dial tone mechanism.

As explained, the desired card is rotated to display position, with the letter displayed in the window 65, to make certain the correct card is in viewing position. This closes the circuit of the particular register. The desired name is located and the number of that name is noted. The line number button, which is the same as the name number, is pushed and the telephone, which has been prerecorded at that address, is recalled to activate the dial means.

This provides for a large number of telephone numbers, as some one hundred to two hundred cards or more may be placed on the shaft. Each card has its own register, so the number of cards times the number of lines on each card determines the number of telephone numbers that can be stored. The configuration may, of course, be changed to suit the designer of the unit, particularly as to the location and placement of the line buttons.

Another magnetic flux actuated switching device suitable for use as the switching element 10 or 68, above described, is a Hall-effect device. The Hall-effect device operates as a solid state electric switch that is normally off or is essentially an open electric switch but, when in the presence of a magnetic flux of a preselected strength, is turned on or is a closed electric switch to provide a circuit connecting means via the device for completing a circuit in the same manner as the magnetic relay as above described.

The advantages of the Hall-effect switching device over a magnetic relay include less cost, greater durability, less power, greater reliability, less susceptibility to hysteresis and to cross-magnetic coupling between adjacent switching devices, and greater sensitivity to a magnetic field.

While the Hall-effect devices may be potted in a block of metallic potting material as shown, it should be appreciated that a significant feature of using a block is to locate each switching device at a fixed position and orient corresponding surfaces of each device in relation to the movable finding means and flux producing magnet to provide a uniform space between each switch and the magnet to ensure the same force on each switch when the actuator is opposite one of the switches. In the present disclosure the switching device is entirely separate and independent and not in physical contact with the card finding element.

A magnetic actuator that has been found to be particularly effective in actuating Hall-effect devices is a high flux density permanent magnet such as a Model No. Recoma 20 manufactured by Recoma Inc. of Fairfield, New Jersey.

Although the present invention has been described with a certain degree of particularity, it is understood that the present disclosure has been made by way of example and that changes in details of structure may be made without departing from the spirit thereof.

What is claimed is:

1. In a telephone index and combined switch device for memory stored dialing data for automatic telephone dialing, the combination comprising:

multiple card index means including a plurality of cards one on another for visual listing of names and telephone numbers, each card including individual lines for individual names and telephone numbers, and finding means arranged for movement along a preestablished path of movement relative to said cards;

card switch means activated by positioning said finding means having a first mode and a second mode, said card switch means being connected in a first circuit arranged for engaging a latching circuit for an individual card, said first circuit being completed via said card switch means in said first mode and interrupted via said card switch means in said second mode, whereby, with a first card selection and with said card switch means in said first mode, the latching circuit for the first card selected remains in effect independently of the operation of said card switch means until said finding means is moved to a second card selection and said card switch means is in said first mode, said card switch means including a plurality of magnetic flux actuated switching devices each including circuit connecting means for completing a circuit via each associated switching device when in the vicinity of a magnetic flux of a preselected strength, said switching devices being mounted at fixed positions with similarly oriented corresponding surfaces disposed along said preestablished path of movement of said finding means;

a single magnetic flux producing actuator movable with said finding means along said path in the vicinity of but not in physical contact with each switching device to provide a substantially uniform distance between said actuator and each switching device for applying substantially the same magnetic force on each switching device when that switching device is directly opposite said actuator during the movement of said actuator along said path while successively actuating said switching devices; and selector switch means operable separate and independent of said card switch means connected in a second circuit corresponding to a particular line and a particular card which, upon actuation after the card switch means is in the first mode, is effective to retrieve and automatically dial a telephone number stored at a location in a memory associated with said particular line.

2. In a telephone index and combined switch device as set forth in claim 1 wherein said cards are disposed on a base and stacked one on another and a cover is positioned on said cards, said finding means being slidably mounted on said cover.

3. In a telephone index and combined switch device as set forth in claim 1 wherein said cards are in a circular arrangement and said preestablished path of movement for said finding means is circular.

4. In a telephone index and combined switch device as set forth in claim 1 wherein said devices are magnetic relays.

5. In a telephone index and combined switch device as set forth in claim 1 wherein said devices are Hall-effect switches.

6. In a telephone index and combined switch device for memory stored dialing data for automatic telephone dialing, the combination comprising:

multiple card index means including a plurality of cards one on another for visual listing of names and telephone numbers, each card including individual lines for individual names and telephone numbers, a cover positioned over said cards, and finding means on said cover arranged for movement along a preestablished path of movement relative to said cards for positioning an individual card for visual display of the card's content, said finding means being carried by and movable along said cover;

card switch means activated by positioning said finding means having a first mode when the cover is closed and a second mode when the cover is open, said card switch means being connected in a first circuit arranged for engaging a latching circuit for an individual card when said cover is closed, said first circuit being completed via said card switch means in said first mode and interrupted via said card switch means in said second mode, whereby, with a first card selection and with said card switch means in said first mode, the latching circuit for the first card selected remains in effect independently of the operation of said card switch means until said finding means is moved to a second card selection and said card switch means is in said first mode, said card switch means including a plurality of magnetic flux actuated switching devices each including circuit connecting means for completing a circuit via each associated switching device when in the vicinity of a magnetic flux of a preselected strength, said switching devices being mounted at fixed positions with similarly oriented corresponding surfaces disposed along said preestablished path of movement of said finding means;

a single magnetic flux producing actuator movable with said finding means along said path in the vicinity of but not in physical contact with each switching device to provide a substantially uniform distance between said actuator and each switching device for applying substantially the same magnetic force on each switching device when that switching device is directly opposite said actuator during the movement of said actuator along said path while successively actuating said switching devices; and selector switch means operable separate and independent of said card switch means connected in a second circuit corresponding to a particular line and a particular card which, upon actuation after the card switch means is in the first mode, is effective to retrieve and automatically dial a telephone number stored at a location in a memory associated with said particular line.

7. In a telephone index and combined switch device for memory stored dialing data for automatic telephone dialing, the combination comprising:

multiple card index means including a plurality of cards one on another for visual listing of names and telephone numbers, each card including individual lines for individual names and telephone numbers, a cover positioned over said cards, and finding means on said cover arranged for movement along a preestablished path of movement relative to said cards for positioning an individual card for visual display of the card's content, said finding means being carried by and movable along said cover;

card switch means activated by positioning said finding means having a first mode when the cover is closed and a second mode when the cover is open, said card switch means being connected in a first circuit arranged for engaging a latching circuit for an individual card when said cover is closed, said first circuit being completed via said card switch means in said first mode and interrupted via said card switch means in said second mode, whereby, with a first card selection and with said card switch means in said first mode, the latching circuit for the first card selected remains in effect independently of the operation of said card switch means until said finding means is moved to a second card selection and said card switch means is in said first mode, said card switch means being in the form of a ganged series of closely spaced magnetic relays carried by said multiple card index means arranged for successive operation, said relays being mounted adjacent each other at substantially the same elevation with their tops in a single plane, said relays including circuit connecting means for completing a circuit via each associated magnetic relay when in the vicinity of a magnetic flux, said relays being enclosed on all sides at fixed positions in a block of a molded potting material, said block including an upper surface closely adjacent to said plane of tops of said relays which are mounted parallel to said planar top, said potting material being non-metallic and having a high permeability to readily pass magnetic flux therethrough, said finding means being carried by and movable along said cover and having a single magnetic flux producing actuator to successively actuate each of said circuit connecting means of an associated magnetic relay while disposed above but not in physical contact with each magnetic relay being actuated; and selector switch means operable separate and independent of said card switch means connected in a second circuit corresponding to a particular line and a particular card which, upon actuation after the card switch means is in the first mode, is effective to retrieve and automatically dial a telephone number stored at a location in a memory associated with said particular line.

8. In a telephone index and combined switching device as set forth in claim 7 wherein said magnetic flux responsive relays are reed relays having double leads, the one set of like leads of said relays extending from said block in a position from one side for connection to a common lead and the opposite leads of each relay extending from said block to be connected to individual circuits.

* * * * *